May 7, 1963 V. PELAGATTI 3,088,727
CONTROL DEVICE OF A WINDOW REGULATOR IN MOTOR CAR DOORS
Filed May 19, 1959 3 Sheets-Sheet 1

INVENTOR.
Vincenzo Pelagatti
BY Harold T. Stowell
Harold L. Stowell
ATTORNEYS

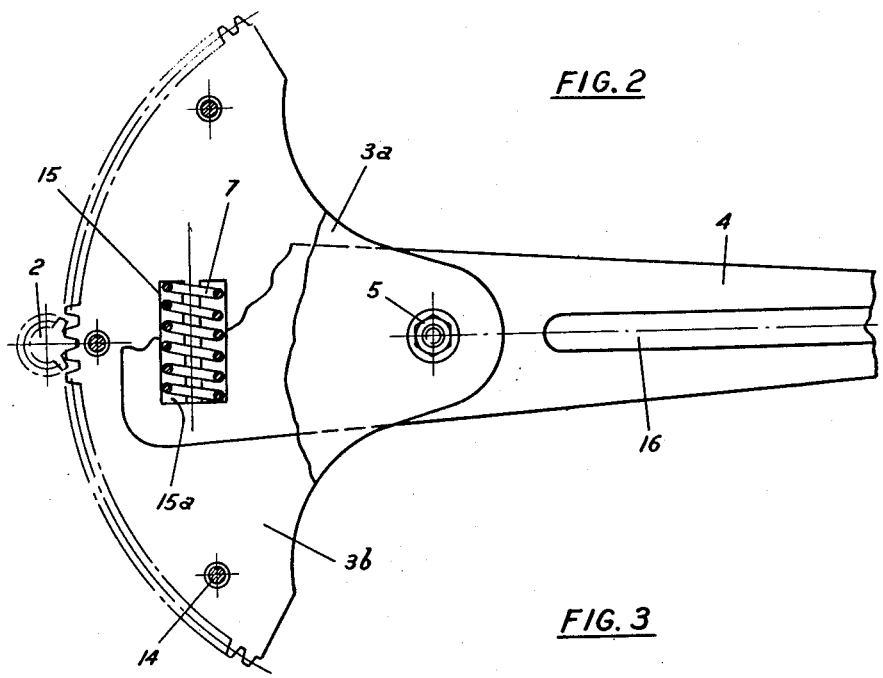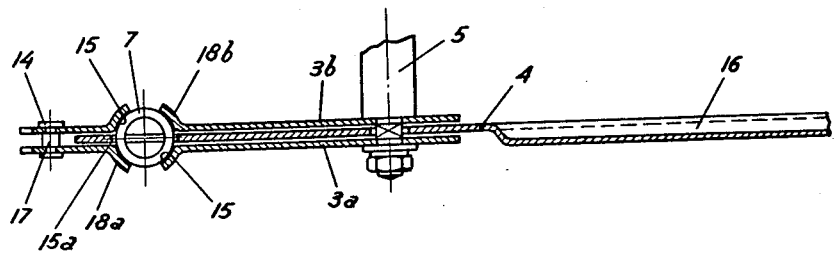

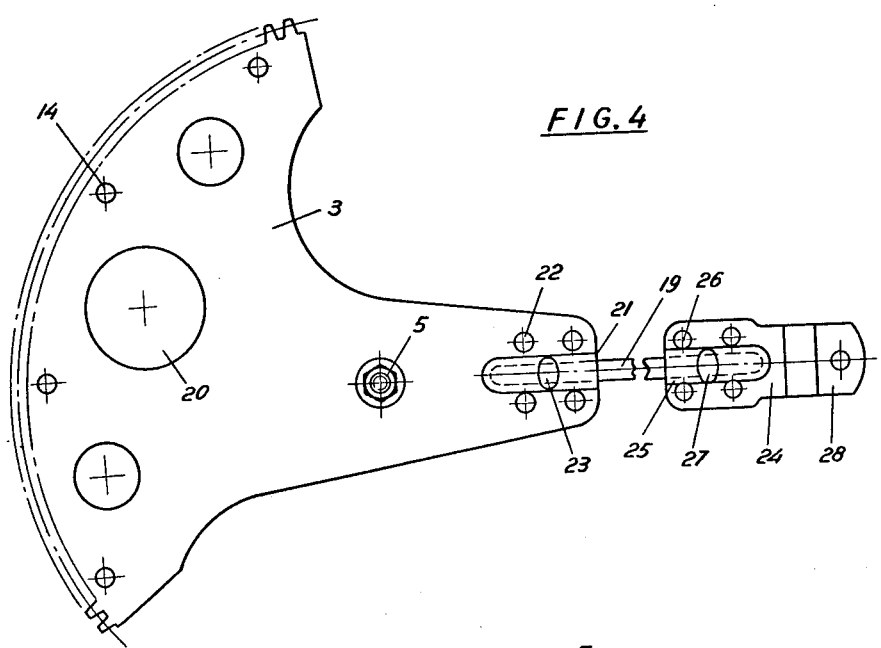
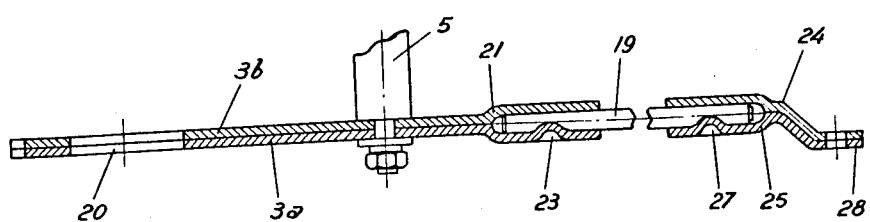

United States Patent Office 3,088,727
Patented May 7, 1963

3,088,727
CONTROL DEVICE OF A WINDOW REGULATOR IN MOTOR CAR DOORS
Vincenzo Pelagatti, Monfalcone, Italy, assignor to Fabbrica Italiana Magneti Marelli S.p.A., Milan, Italy, a firm
Filed May 19, 1959, Ser. No. 814,270
Claims priority, application Italy June 19, 1958
4 Claims. (Cl. 268—126)

The present invention refers to a control device for a window regulator, and is usually arranged inside the door of a motor vehicle and comprises a small electric motor, a sector gear associated to the small electric motor and a control lever for the sliding window glass which is rigidly connected to the sector gear.

It is known that in such devices it is necessary to take under consideration the kinetic energy which is stored by the rotating part of the small electric motor when the window glass reaches the end of its fully closed or upward position.

In this position even though the feeding circuit of the motor is interrupted, the armature thereof continues running due to its inertia until the stored energy is fully used. This motion is transmitted to the rigid transmission connecting the motor and the window glass and therefore the mechanical transmission members are noticeably stressed whenever the window glass reaches its stroke end.

Many endeavors have been made for the purpose of consuming the kinetic energy at the end of each window glass stroke, by using in the driving transmissions rubber resilient couplings as fitted to the motor shaft before or after the speed reduction gear. However, these endeavors have been found defective especially to the small space existing inside of the thin vehicle doors, wherein the device is to be arranged.

Moreover, the transmisison efficiency depends on the rubber life which is not long, as well as on running of the device and on the temperature inside of the vehicle doors that sometimes is very high.

It is to be understood therefore that time losses and other difficulties are frequently encountered in having some of the parts of the conventional devices substituted or repaired.

It is the object of this invention to avoid such drawbacks by using a control device for the window regulator which is simple to install and requires a minimum space.

It is characterized by a resilient member inserted between the sector gear coupled to the small electric motor and the window glass bearing. The resilient member provides a means to take up the kinetic energy of the moving parts when the window glass reaches the end of its stroke or is in a fully closed position.

According to one embodiment of the device, the resilient member is interposed between the sector gear, as controlled by the armature of the small electric motor, and the control lever of the window glass.

The same objective is reached through another embodiment of the present invention by having recourse to a resilient arm instead of the rigid control lever.

Both embodiments of the invention allow small rotation movements of the sector gear and therefore of the motor at the end of the window glass stroke.

The device according to the invention will now be described hereinbelow with reference to the accompanying drawings, in which:

FIG. 2 is a side section view of the control transmission according to a first embodiment thereof;

FIG. 3 is a longitudinal section of the control transmission as shown in FIG. 2;

FIG. 4 illustrates a side view of the control transmission according to another embodiment thereof; and FIG. 5 is a longitudinal section of the control transmission as illustrated in FIG. 4.

Figure 1:
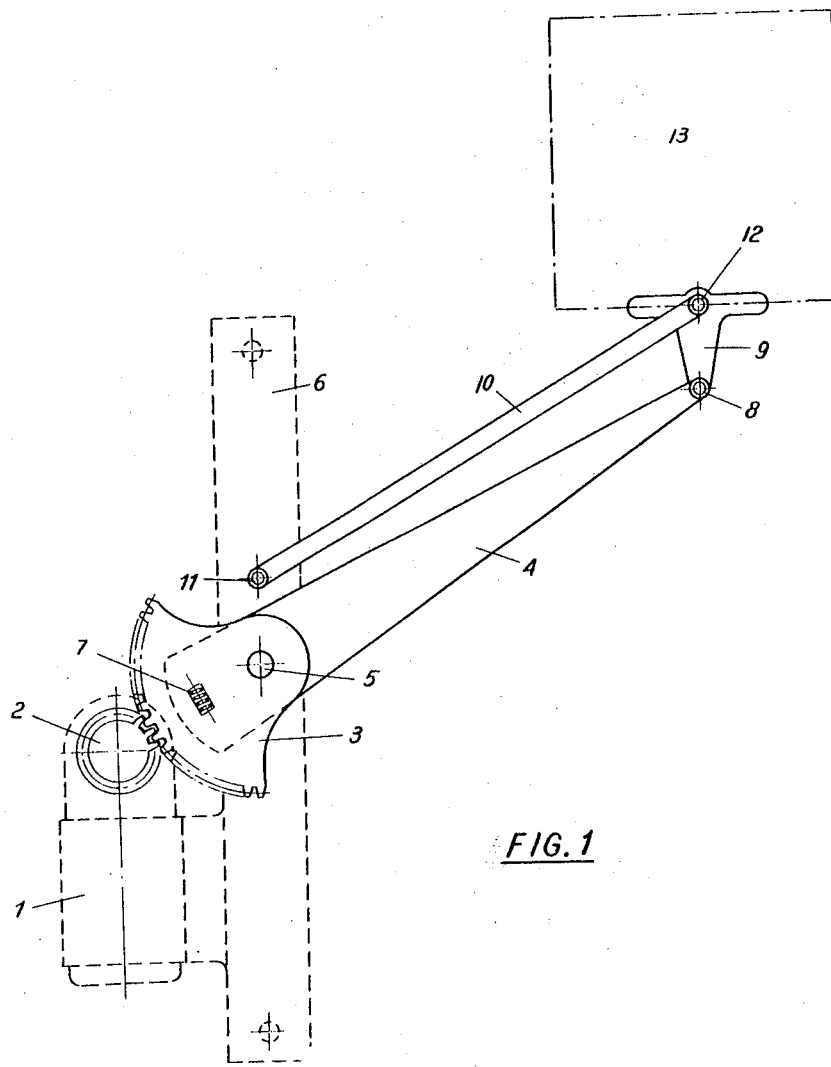
FIG. 1 shows a diagram of the whole control device of the window regulator.

In FIG. 1 there is shown a small electric motor 1 with a shaft supporting the pinion 2 coupled to the sector gear 3 which is pivotally connected with the lever 4 at point 5 of a plate 6, which in turn is secured to a vehicle door. The lever 4 is coupled on one side to the sector gear 3 through a resilient member 7 and on the other side is pivotally connected to a bracket 9 at point 8. The bracket 9 is integral with and depends from the channel member carrying the window glass 13.

A rigid rod 10 is pivotally connected at point 11 with the plate 6 and a like connection is provided at 12 to the bracket 9 at the other end of this rod. The distances between the pivot points 5—11 and 8—12 are equal, and therefore an articulated parallelogram is formed by the members 4, 6, 9 and 10, that allows only a vertical motion of bracket 9 and window glass 13.

The sector gear 3, as illustrated in FIGS. 2 and 3, is comprised by two shaped plates 3a and 3b that are arranged parallel to one another and secured together by means of rivets 14. These plates are spaced from one another in such a manner as to form a space between them, wherein motion of the end of lever 4 can take place. The plates 3a and 3b have at their middle part an outward protuberance, that is obtained for instance through cutting and pressing so as to embody a cylindrical inside recess 15, wherein the spring 7 is arranged that forms the resilient member as provided to take up the kinetic energy.

In the end of the lever 4 which is coupled to the sector gear 3, a rectangular opening 15a is provided, corresponding to the right angle cross-section of cylindrical recess 15 and wherein the spring 7 is arranged. Relative movement between sector gear 3 and lever 4 may therefore be effected through the spring 7. A rib 16 extends through substantially the entire length of the lever arm 4 between the pivot points 5 and 8 for increasing the stiffness of the lever.

FIG. 3 shows particularly the spacing member 17 interposed between the plates 3a and 3b that form the sector gear, and moreover the shape of clips 18a and 18b of the plates at the opening 15.

FIGURES 4 and 5 illustrate another embodiment of the device. The sector gear 3 is pivotally connected at point 5 which in turn is secured to the vehicle door. The sector gear 3 comprises two plates 3a and 3b in overlapping relation with one another and rigidly connected together for instance by means of rivets 14. The plates 3a and 3b are coupled on one side to the pinion of the small electric motor and on the other side they protrude beyond the pivotal connection 5 and are connected to a resilient arm 19, that is interposed between the plates and the window glass channel. The arm 19 is formed of a small rod with a circular or rectangular cross-section and made preferably of spring steel, and forms the taking up member of the kinetic energy.

The fitting of arm 19 to the sector gear 3 is obtained by the insertion of the corresponding end thereof into a cylindrical recess 21 which is formed by suitably shaping the projections of both plates 3a and 3b. The rivets 22 and a stop caulking 23, as provided on at least a projection of one of the plates 3a or 3b, corresponds to a mating recess on the resilient arm 19 and serve to secure the arm 19. The other end of the arm 19 is connected to the window glass channel by means of coupling 24 which is formed by two plates facing one another and shaped in a manner similar to the plates 3a and 3b. A cylindrical recess 25, wherein the other end of the arm 19 is arranged, and 26, 27 indicate respectively the rivets to secure the parts of the coupling and the stop caulking. This coupling terminates in a projection 28 having a hole formed therein enabling a pivotal connection to the window glass channel member.

The sector gear 3 may be provided with lightening holes 20 for reducing the weight thereof without reducing the strength of the sector gear.

A rotational movement of pinion 2 of the electric motor causes an opposite rotation motion of sector gear 3 about the pivot 5 during operation of the device. In this step, with reference to FIGURES 2 and 3, the gear sector charges or tends to compress the spring 7 and causes a corresponding delayed rotational movement of the lever 4 in the same direction. It is to be understood that such a rotational movement will take place only when the spring load overcomes the initial resistances opposing the motion of the window glass. At the end of the window glass stroke, the inertia of the motor and all transmission masses tend to continue their motion whereas any movement of the end of the lever 4 which is connected to the window glass channel is prevented. The spring 7 operates in such a moment to take up the residual kinetic energy allowing an angular deflection of sector gear 3 and consequently of pinion 2 and the motor, without causing useless and harmful overstresses in all of the transmission members.

Referring to FIGURES 4 and 5, the sector gear 3 by carrying out a rotation movement in a counter clockwise direction, about pivot 5, effects an upward motion of the resilient arm 19, which causes an inflection thereof due to the resistance imposed on the end of the resilient arm 19 by the weight of the window glass. It will be appreciated that when the energy, stored during the inflection, after an angular deflection of the sector gear overcomes the resistance or load of the window, the window glass will then rise and a soft gradual lifting motion thereof will take place.

In a like manner as in the case of FIGURES 2 and 3, when the window glass has reached the end of its upward travel and the end of the resilient arm that is connected to the window glass is prevented from a further upward motion, then the residual energy as due to the inertia of the masses is taken up by the said resilient arm 19 with consequent deflection thereof and thereby prevents harmful overstresses of all device members.

In the preceding specification a resilient transmission comprised only of a spring or resilient arm has been described; however, the use of two or more springs is contemplated according to the requirements of practice. It is to be understood that in such a case the number of lever openings as well as the cylindrical recesses for receiving the springs shall correspond to the number of springs.

I claim:

1. Apparatus for controlling the displacement of window glass comprising a support, a pivot pin mounted on said support, an arm having one end pivotally connected to said pivot pin and the free end pivotally connected to said window glass, a sector gear pivotally mounted on said pivot pin, spring means torsionally and elastically connecting said sector gear to said arm, a second arm having one of its ends pivotally connected to said support and its other end pivotally interconnected with the free end of said first mentioned arm to thereby form a deformable parallelogram, and means for effecting movement of said sector gear about said pivot pin to cause associated movement of the window glass.

2. Apparatus for controlling the displacement of window glass comprising a support, a pivot pin mounted on said support, an arm pivotally connected to said pivot pin, one end of said arm pivotally connected to the window glass and the other end of said arm provided with a spring receiving aperture, a sector gear pivotally mounted on said pivot pin, said sector gear provided with a spring receiving aperture, the spring receiving apertures in said arm and said sector gear being normally in superposed mating relationship, unitary spring means disposed within the spring receiving apertures of said arm and said sector gear, means for maintaining said spring means within the apertures whereby said arm and said sector gear are torsionally and elastically connected together, and means for effecting movement of said sector gear about said pivot pin to cause associated movement of the window glass.

3. The invention defined in claim 2 wherein said spring means comprises a helical spring having its free ends in engagement with opposite transverse edges of the apertures in said arm and said sector gear.

4. The invention claimed in claim 3 wherein said sector gear is comprised of two substantially similar sections spaced from one another in back-to-back relationship with the terminal portion of said one end of said arm disposed for movement therebetween whereby said spring means militates against relative movement between said arm and said sector gear until predetermined counteracting forces are imposed on said arm and said sector gear.

References Cited in the file of this patent

UNITED STATES PATENTS

| | | |
|---|---|---|
| 2,232,418 | Warren | Feb. 18, 1941 |
| 2,795,414 | Wise | June 11, 1957 |